United States Patent [19]

Tsukakoshi et al.

[11] Patent Number: 5,018,133
[45] Date of Patent: May 21, 1991

[54] NETWORK SYSTEM COMPRISING A PLURALITY OF LANS USING HIERARCHICAL ROUTING

[75] Inventors: Masato Tsukakoshi, Yokohama; Yasuhiro Takahashi, Fujisawa; Matsuaki Terada, Machida; Nobuyuki Takagishi, Hadano, all of Japan

[73] Assignee: Hitachi, Ltd., Tokyo, Japan

[21] Appl. No.: 582,781

[22] Filed: Sep. 6, 1990

Related U.S. Application Data

[63] Continuation of Ser. No. 270,844, Nov. 14, 1988, abandoned.

[30] Foreign Application Priority Data

Nov. 18, 1987 [JP] Japan ................. 62-289319

[51] Int. Cl.$^5$ ........................... H04J 1/16; H04J 3/02; H04J 3/14; H04J 3/24
[52] U.S. Cl. ................. 370/16; 340/825.02; 340/825.51; 340/827; 370/85.6; 370/85.13; 370/94.3
[58] Field of Search ............. 340/825.02, 825.03, 340/825.05, 825.5, 825.51, 826, 827; 370/85.6, 85.13, 85.14, 16, 16.1, 94.3, 94.1, 60, 60.1; 371/11.1, 11.2

[56] References Cited

U.S. PATENT DOCUMENTS

| 3,693,155 | 9/1972 | Crafton et al. | 340/825.02 |
|---|---|---|---|
| 3,889,064 | 6/1975 | Fletcher | 370/94.3 |
| 4,638,476 | 1/1987 | Acampora et al. | 370/94.1 |
| 4,701,756 | 10/1987 | Burr | 340/825.02 |
| 4,706,080 | 11/1987 | Sincoskie | 340/825.02 |
| 4,706,081 | 11/1987 | Hart et al. | 340/825.03 |
| 4,809,265 | 2/1989 | Hart et al. | 370/85.13 |
| 4,811,337 | 3/1989 | Hart | 370/85.13 |
| 4,823,124 | 4/1989 | Beauchemin | 370/61 |
| 4,953,162 | 8/1990 | Lyons et al. | 370/94.1 |

FOREIGN PATENT DOCUMENTS 0305638 12/1988 Japan ................. 370/85.13

OTHER PUBLICATIONS

Dalal et al., "Reverse Path Forwarding of Broadcast Packets", 12/78, vol. 21, #12, pp. 1040–1048.
Perlman, "An Algorithm for Distributed Computation of a Spanning Tree in an Extended LAN", 1984, IEEE 802,85R1.

Primary Examiner—Sandra L. O'Shea
Assistant Examiner—Brian Zimmerman
Attorney, Agent, or Firm—Antonelli, Terry, Stout & Kraus

[57] ABSTRACT

In a network system according to the hierarchical routing method, in which at least one main LAN and a plurality of sub-LANs are connected hierarchically through bridges, bridge IDs having the smallest values in the network are given to a plurality of bridges (first bridges) connected to the main LAN. Bridge IDs unique to each other having values greater than the bridge IDs of the first bridges are given to a plurality of bridges (second bridges) connecting sub-LANs. Each of the first bridges transmits periodically a control message (Hello message) for making the network in a tree structure by using some of the second bridges as backup bridges to the side of the sub-LANs. When a change takes place in the topology of the network, the reconstruction of the tree structure is effected in a localized part of the network including a position of hindrance, the root of the network being constituted by a particular first bridge.

6 Claims, 7 Drawing Sheets

NETWORK SYSTEM COMPRISING A PLURALITY OF LANS USING HIERARCHICAL ROUTING

This application is a continuation of application Ser. No. 270,844, filed Nov. 14, 1988, now abandoned.

BACKGROUND OF THE INVENTION

This invention relates to a network system, and in particular a network system comprising a plurality of LANs (Local Area Networks) using hierarchical routing.

As one of the routing methods in a network system, in which a plurality of LANs are connected with each other, there is a known the hierarchical routing method on which standardization is based according to IEE 802.1. According to a description in IEEE 802.85*1, An Algorithm for Distributed Computation of a Spanning Tree in an Extended LAN (1985), .this is a routing method,, by, which relay control is effected by having a bridge mutually connecting two LANs uses a routing table indicating to which of the 2 connected LANs the terminal in an LAN connecting system is directed.

The routing table of each bridge is updated every time the relevant bridge relays a communication frame transmitted by the terminal so that the content of the routing table becomes more and more substantial. Suppose now, for example, that a bridge connecting a first LAN and a second LAN has received a frame having a source address (SA)="0001" from the first LAN. This bridge knows that there exists a terminal, whose address equals "0001" on the first LAN side, and registers the address "0001" of the terminal in the routing table, making it correspond to the first LAN.

Thereafter, when the fine bridge has received a frame having a destination address (DA)="0001" from the second LAN, the bridge refers to the routing table to be able to judge whether the received frame should, be relayed to the first LAN. Since each of the bridges registers the relation between the source address of a frame and the LAN, from the side from which the frame is inputted, in the routing table, every time a frame is received, if the address has not yet been registered, the content of the routing table is updated and becomes more substantial.

For executing the hierarchical routing described above it is presumed that the form of connecting the LANs in the network with each other has a tree structure, i.e. no loop is formed by several LANs at any part of the network. This is because, if several LANs form a loop with each other, there can exist plural paths between, two terminals, which gives rise to a problem that a plurality of the same frames are produced in the network. However, if the network is so constructed originally that the form of connecting the LANs with each other is a tree structure so as to avoid this problem other problems are produced in that there are no backup paths, if some hindrances occur, and there are restrictions to extending the system, etc.

Therefore the hierarchical routing system is supported by an algorithm to logically adopt a form of connection having a tree structure, starting from an arbitrary form of connecting LANs with each other. This algorithm is called a "spanning tree algorithm" and a constructed "tree consisting of LANs" is called a "spanning tree".

The spanning tree algorithm is carried out by sending and receiving a special control message called a "Hello message" between different bridges. At the initial setting, each bridge effects a broadcast transmission of a Hello message to all the other bridges. Each of the bridges has a bridge ID (identification No.), which is unique within the network, and the ID of the destination bridge and the bridge ID of a bridge which is the transmitter of the message, is written in the root identifier field in the Hello message. Each bridge compares the root identifier in a received Hello message with its own bridge ID and if the value of the received ID is smaller than its own ID, the bridge stops the transmission of the Hello message. In this way, as an end result, only the bridge having the smallest ID maintains the transmission of the Hello message. This bridge is the root bridge of the spanning tree. The other bridges are divided into two groups, i.e. bridges relaying frames (active bridges) and bridges which don't relay frames (backup bridges), according to a particular algorithm, which forms a spanning tree.

Also, in the case where some hindrances have occurred in transmission paths within a spanning tree once constructed, broadcast communication of the Hello message is effected and the spanning tree is reconstructed using the message. The root bridge is one of the active bridges. In this specification the active bridges other than the root bridge are called designated bridges.

However, according to the prior art techniques, no consideration was given to a network system having a hierarchical structure, in which a plurality of LANs having a relatively low speed (called sub-LANs or secondary LANs) are connected with an LAN having a high speed and a large capacity (called main LAN or primary LAN) and it has a problem results as follows.

That is, in a network according to the hierarchical routing method, a communication message or packet between 2 sub-LANs, which are in a positional relation in which they can communicate with each other by using a backup bridge, cannot help passing through the root bridge in the spanning tree and as a result there is a tendency for traffic to be concentrated in the neighborhood of the root bridge. It is desirable that this concentration of the traffic be dealt with by the main LAN having a high speed and a large capacity with respect to subLANs. However, according to the prior art techniques, since no consideration was given to providing network structure having a main LAN with a large data transmission capacity as described above, there was a possibility that a bridge connecting sub-LANs would serve as the root bridge in the spanning tree. In this case, there was the possibility that the root bridge will not be able to deal with the concentrated traffic with the result that it falls into an overcrowding state.

SUMMARY OF THE INVENTION

An object of this invention is to provide a network according to the hierarchical routing method, capable of avoiding overcrowding of communication at the root bridge.

Another object of this invention is to provide a network comprising at least one main LAN having a large data transmission capacity and a plurality of subLANs having a relatively low data transmission capacity, capable of avoiding overcrowding of communication at the root bridge on the spanning tree structure.

Still another object of this invention is to provide an improved spanning tree structure control method for the network according to the hierarchical routing method.

In order to achieve the above objects, this invention is characterized in that, in a network comprising a plurality of sub-LANs and at least one main LAN, a subsystem comprising the main LAN and a plurality of bridges connected to this main LAN (called first bridges) is considered logically as one bridge and this logical bridge is disposed so as to serve as the root bridge in the spanning tree.

According to this invention the traffic concentrated in the neighborhood of the root bridge can be dealt with without any hindrance due to the fact that a main LAN having a large data transmission capacity is located at the root of the spanning tree.

For locating the main LAN at the root of the spanning tree, it is sufficient to give each of the first bridges the same bridge ID having a value of highest priority (e.g. smallest value) in the network. In the process for forming the spanning tree each of the bridges transmits a Hello message and finally each of the first bridges becomes a root bridge by judging the priority of the bridge ID (root ID) of the transmitter contained in the Hello message so that the transmission operation of the Hello message is repeated. Consequently, each of the first bridges connected to the main LAN may be constructed so as to transmit the Hello message only to the connection port side of each of the sub-LANs and it is not necessary to transmit the Hello message to the connection port of the main LAN. In the case where Hello, messages are received from the side of the sub-LANs at the time of starting the network system, the first bridges may neglect these Hello messages and it is not necessary to relay them to the main LAN.

When the transmission of the Hello messages at the root bridge is restricted to the sub-LAN connection port side, bridge IDs given to the first bridges have not necessarily the same value. That is, so far as they have a priority, which is higher than that given to the bridge IDs of the second bridges connecting sub-LANs, bridge IDs, which are unique to each other, may be given to these first bridges.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
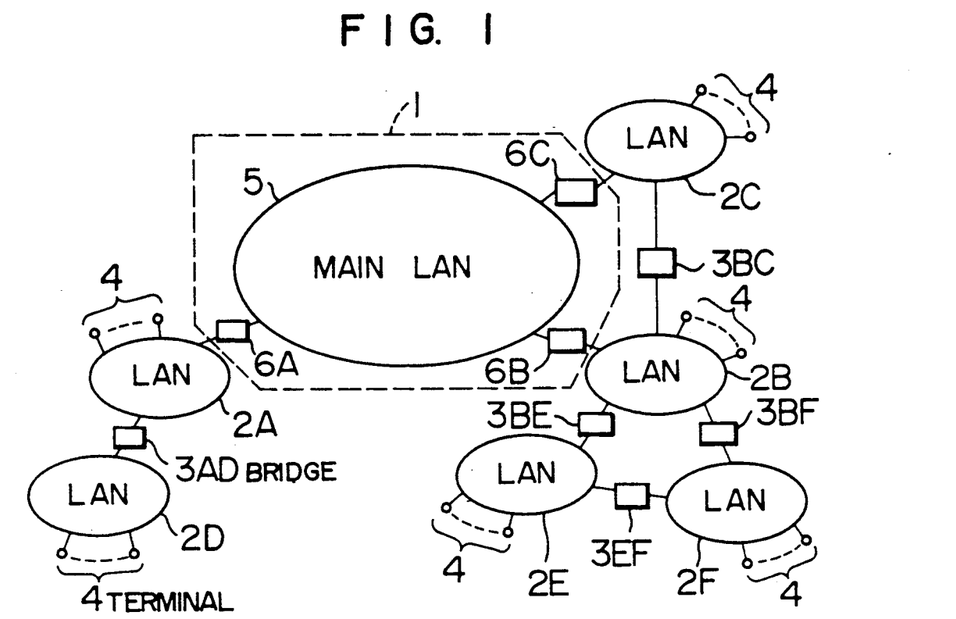
FIG. 1 is a scheme showing an example of the network system comprising a plurality of LANs, to which this invention is applied.

FIG. 1 indicates an example of the network system comprising a main LAN 5 and a plurality of sub-LANs 2A to 2F, to which this invention is applied. The sub-LANs 2A to 2C and the main LAN 5 are coupled by bridges 6A to 6C (called first bridges), respectively, while the subLANs 2A to 2F are coupled by bridges 3AD to 3EF (called second bridges), respectively. Further a plurality of terminal devices 4 are connected with each of the subLANs.

Figure 2:
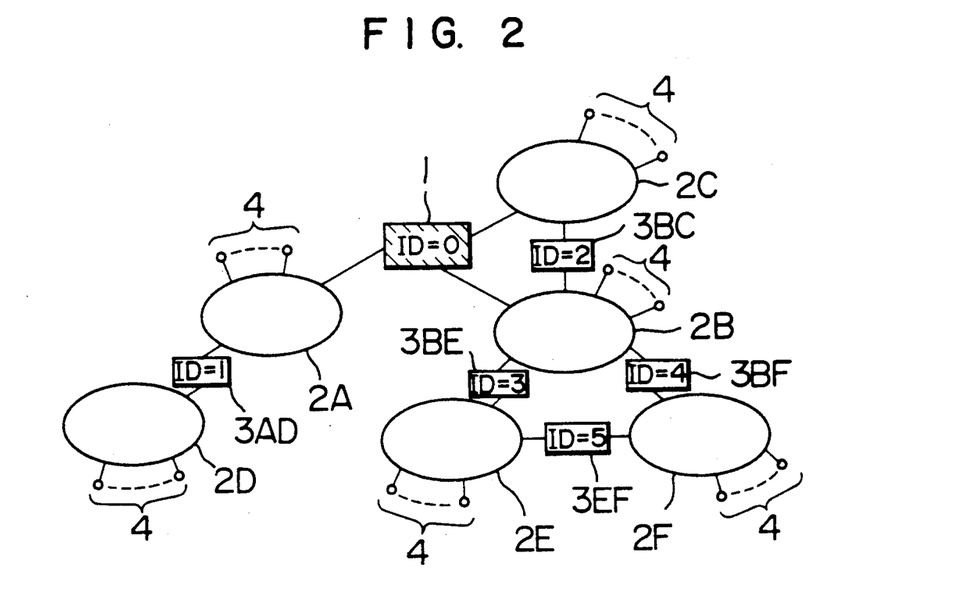
FIG. 2 is a scheme illustrating a network structure, in the case where the main LAN 5 in the network indicated in FIG. 1 is considered as a logical bridge.
Figure 3:
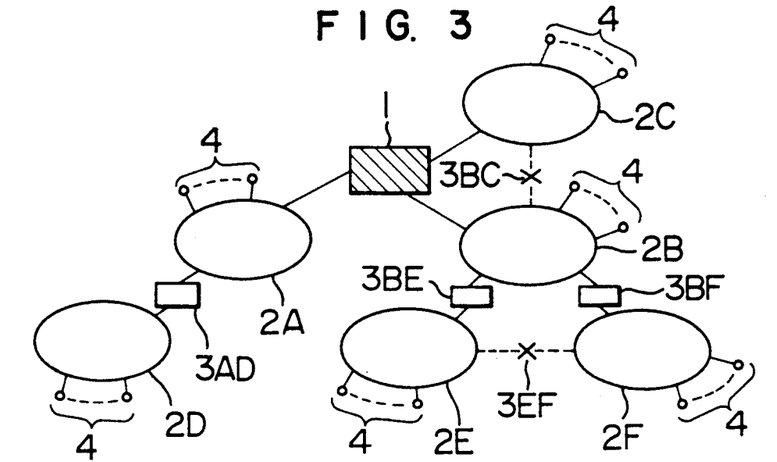
FIG. 3 is a scheme showing the form of the spanning tree forming the network indicated in FIG. 1 by applying this invention thereto.

According to this invention, the network system is so constructed that a sub-system (enclosed by a broken line) comprising the first bridges and the main LAN 5 constitutes a logical bridge 1, as indicated in FIG. 2, by giving each of the first bridges 6A to 6C a same ID in the network described above. The logical bridge 1 is so arranged that it is at the root of a logical tree structure, as indicated in FIG. 2, when the spanning tree algorithm is executed, by the fact that the ID given to the first bridge or bridges is the smallest ID in the network. When the spanning tree algorithm is executed, the second bridges are divided into two groups, i.e., designated bridges (3AD, 3BE, 3BF), which effect relay operation of a frame, and backup bridges (3BC, 3EF) indicated by X marks in FIG. 3 which don't effect relay operation of a frame, and a tree-like network, in which only one communication path exists between any two terminals.

Figure 4:
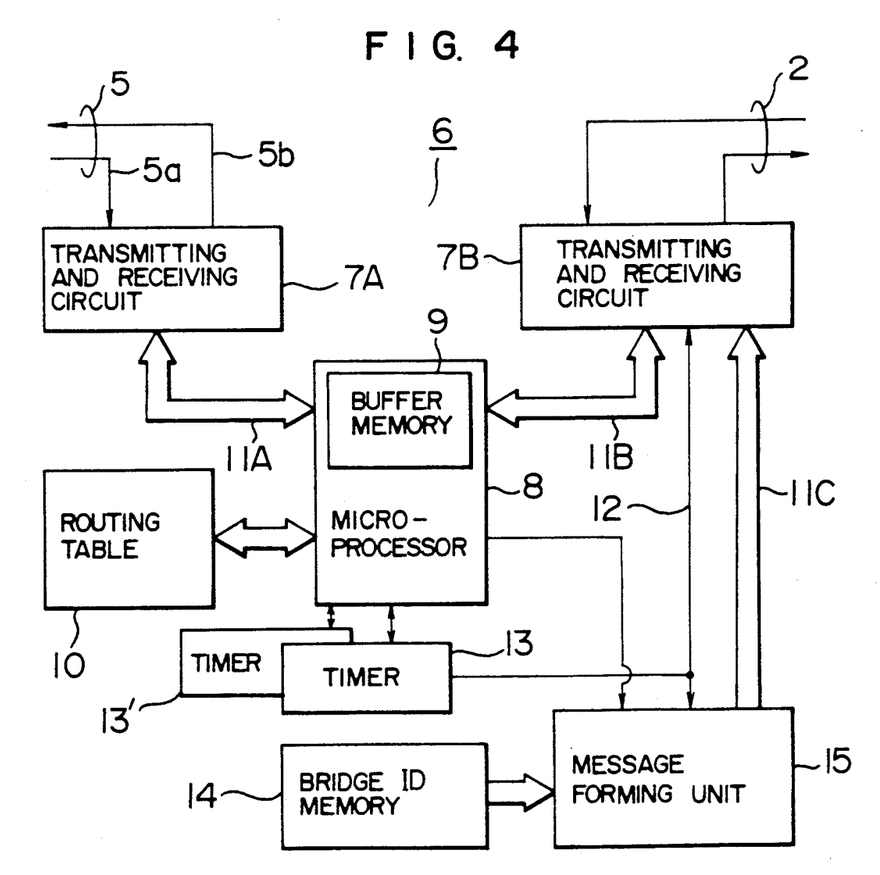
FIG. 4 is a scheme illustrating the construction of a first bridge connected with the main LAN.

FIG. 4 indicates the structure of a first bridge 6 (6A-6C). In the figure, reference numeral 7A is a transmitting and receiving circuit connected to the main LAN 5; 7B is a transmitting and receiving circuit connected to a sub-LAN 2; and 8 is a microprocessor (frame relay means) connected to the transmitting and receiving circuits (7A and 7B) through internal buses 11A and 11B. The transmitting and receiving circuit 7A relays a frame received from the input side 5a of the main LAN to the output side 5b and at the same time sends a copy of the received frame to a buffer memory 9 in the microprocessor 8. The microprocessor 8 refers to a routing table 10 on the basis of the destination address of this received frame and when it is judged that the terminal of this destination address of the relevant received frame exists on the side of the sub-LANs 2, the received frame is sent to the transmitting and receiving circuit 7B. On the other hand, in the case where the received frame doesn't exist on the side of the sub-LANs, the microprocessor 8 aborts the received frame. The frame, which the transmitting and receiving circuit 7B has received from the sub-LANs, is dealt with in the same way and is relayed selectively to the side of the main LAN by the microprocessor 8.

As described above, according to this invention, the subsystem comprising the main LAN and a plurality of first bridges 6 is made act as one logical bridge so as to be the root of the spanning tree. For this reason it is sufficient for the first bridge 6 serving as the root bridge to transmit the Hello message only to the side of the sub-LANs 2 and it is not necessary to transmit it to the side of the main LAN 5. In FIG. 4 reference numeral 13 is a timer counting the time lapse for sending periodically the Hello message; 14 is a memory storing the bridge ID (ID=0 in the example indicated in FIG. 2) assigned to the bridge 6; and 15 is a Hello message forming unit sending the Hello message of a predetermined format including the bridge ID stated, above at the moment where the timer 13 is in a time-out state. In the first bridge the output of the Hello message forming unit is connected to the transmitting and receiving circuit 7B on the side of the sub-LANs through an internal bus 11c so that the Hello message is sent out to the sub-LANs 2, when the timer 13 is in a time-out state.

The second bridge 3 has a structure, which is basically identical to that indicated in FIG. 4. However it is so constructed that the output of the message forming unit 15 is sent to both of the transmitting and receiving circuits 7A and 7B connected to different sub-LANs. Further there is disposed a Hello message receiving timer 13' for judging whether the Hello message sent periodically by the root bridge is received normally or not.

Figure 5:
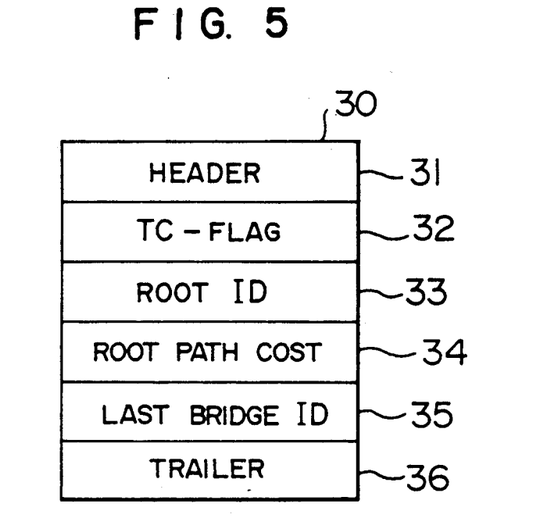
FIG. 5 is a scheme indicating the format of a Hello message.

FIG. 5 shows the format of a Hello message 30. The Hello message 30 consists of a Header 31 indicating the head of the Hello message; a TC-Flag 32, which will be explained later; a root ID 33 indicating the bridge which is the transmitter of the Hello message; a Root Path Cost 34 indicating the path cost, which is rewritten at each of the bridges (relay bridges), through which the Hello message passes, from the relevant relay bridge to the root bridge; a Last Bridge ID 35 indicating the ID of the last bridge, through which the Hello message has passed; and a Trailer 36 indicating the termination of the Hello message.

Figure 6:
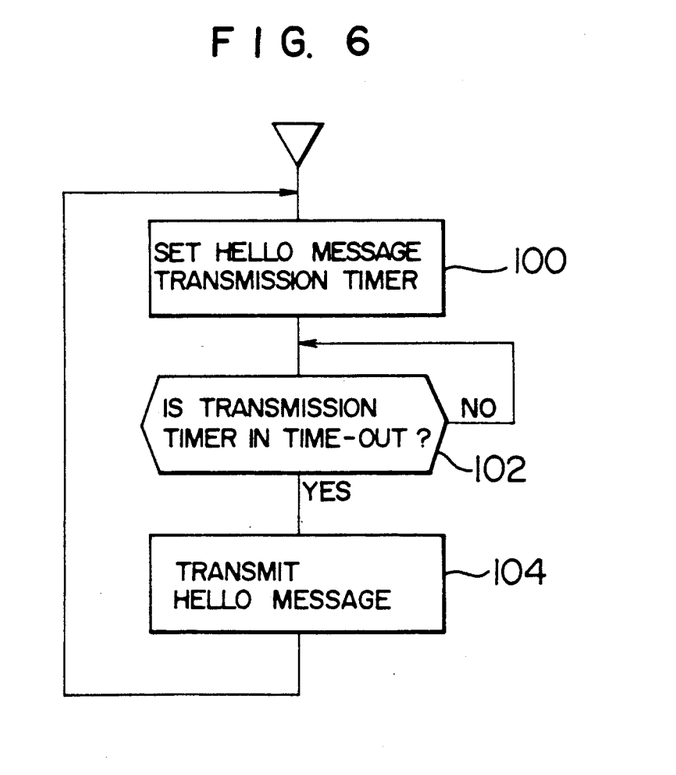
FIG. 6 is a flow chart showing a Hello message transmission operation in each of the bridges.

FIG. 6 is a flow chart of a transmission processing routine for the Hello message at the first bridge 6. This routine is started at the time of starting of the bridge; it sets the Hello message transmission timer 13 at first Step 102; sends the Hello message (Steps 102-104) at the moment where the transmission timer 13 is in a time-out state; and returns to Step 102, by which the transmission timer is set, every time the Hello message is transmitted; so that the Hello message is outputted periodically. In the bridge 6 the transmission of the Hello message (Step 104) is effected only to the output port of the sub-LAN 2, that is, to the side of the transmitting and receiving circuit 7B.

Also in the second bridges 3 (3A-3F) a routine similar to that indicated in FIG. 6 is started at the time of starting of the bridge and an operation to transmit the Hello message is effected. In this case the Hello message is sent to all the output ports (transmitting and receiving circuits). However, as explained later, since the second bridge is so constructed that it stops the Hello message transmission timer, when a Hello message having a Root ID with a priority higher than its own priority (smaller number) is received, it is finally only the first bridge that repeats the operation to transmit the Hello message. The second bridge acquaints itself with the fact that the bridge itself is no root bridge i.e. it is a second bridge by the fact that it has received a Hello message having a priority higher than its own priority.

Figure 7:
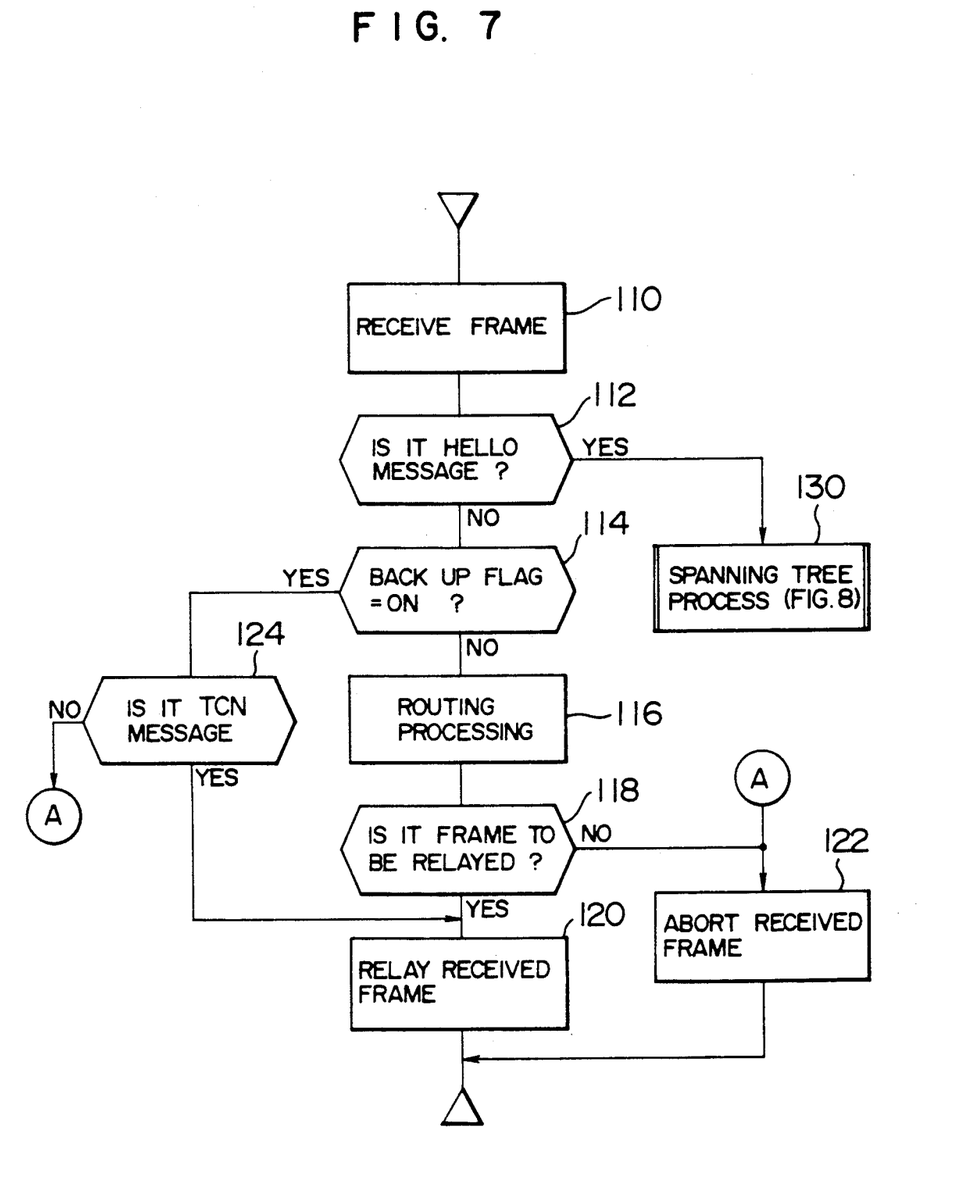
FIG. 7 is a flow chart showing an operation at receiving a frame at a second bridge connecting sub-LANs.

FIG. 7 is a flow chart for explaining the operation, when a second bridge 3 receives a frame from an adjacent LAN.

When a frame is received from the adjacent LAN (Step 110), it is judged whether it is a Hello message or not (Step 112). If it is a Hello message, the bridge proceeds to the spanning tree process 130 indicated in FIG. 8. In the case where the received frame is not a Hello message, the backup flag indicating whether the bridge is a designated bridge or a backup bridge is checked (Step 114). If the flag is not ON (i.e. in the case where the bridge is operating as a designated bridge), the routing table is referred to and updated (routing processing) in Step 116. If the received frame is a frame to be relayed to the other side of the LANs, the frame is relayed (Steps 118 to 120). If the received frame is none which should be relayed, it is aborted (Step 122). If the backup flag is ON (i.e. in the case where the bridge is operating as a backup bridge), it is judged whether the received frame is a TCN message explained later or not (Step 124). If it is a TCN message, it is relayed to the other LAN (Step 120) and if it is not, the received message is aborted (Step 122).

Figure 8:
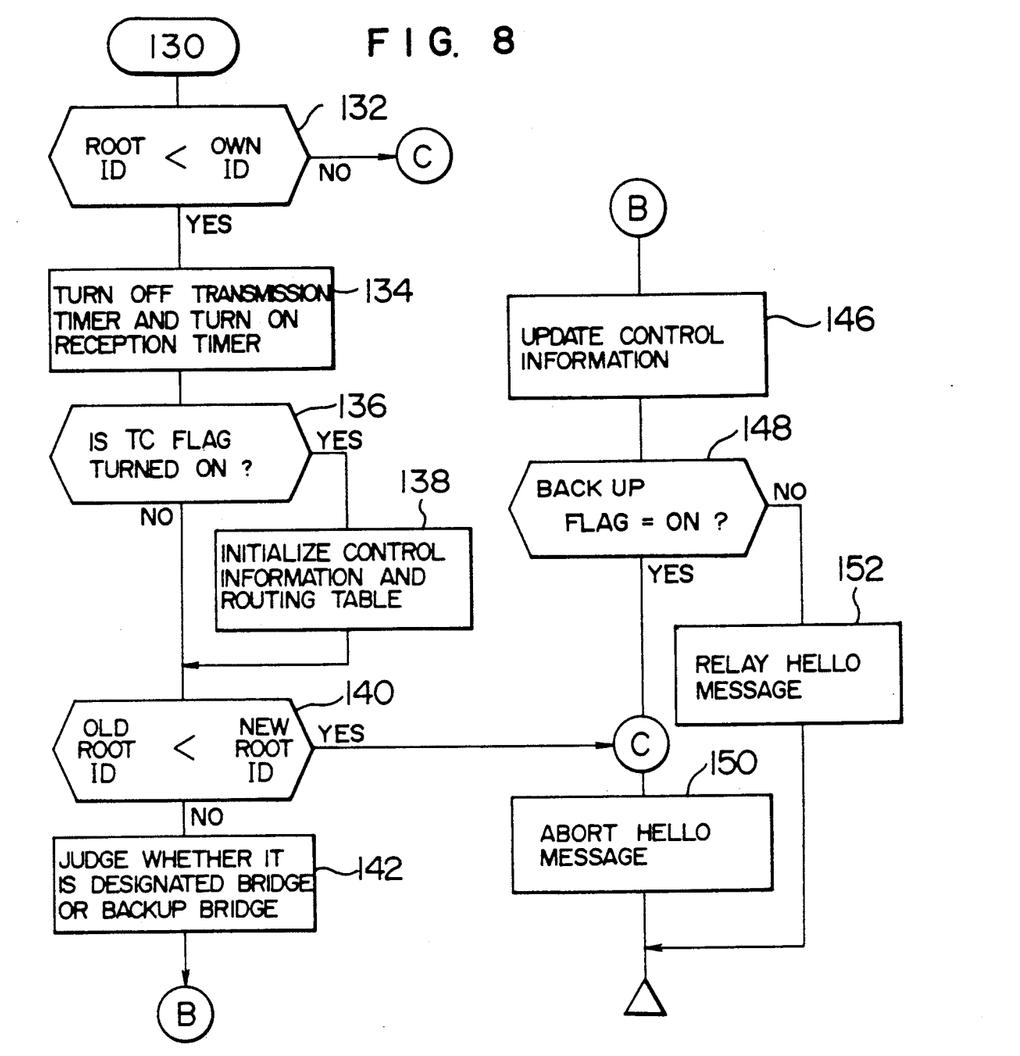
FIG. 8 is a flow chart indicating the spanning tree process 130 in FIG. 7 in detail.

FIG. 8 is a flow chart indicating the content of the spanning tree process.

In the case where the received frame is a Hello message, each of the second bridges compares the root ID 33 in the received Hello message with its own bridge ID (Step 132) and unless the former is smaller than the latter, the Hello message is aborted (Step 150). In the case where -the root ID in the Hello message is smaller than its own bridge ID, the bridge judges that the bridge itself is not a root bridge and turns off the Hello message transmission timer 13 (Step 134). Further, at this time, the Hello message reception timer 13' is turned on.

Next, in Step 136, the state of the TC flag 32 in the received Hello message is checked. The TC flag is one for indicating that it is a special Hello message, which the root bridge sends for reconstructing the spanning tree, when an abnormality occurs in the spanning tree once constructed. When the TC flag 32 is in the ON state, the bridge initializes control information for forming the spanning tree and the content of the routing table (Step 138).

Every time a Hello message is received, each of the bridges updates control information in Step 146, one of the control information stored in each of the bridges being the root ID smallest in the received Hello message. In Step 140 the stored root ID (old root ID) is compared with the root ID contained in the received message (new root ID). If the latter is greater than the former, the Hello message is aborted (Step 150). In the case where the new root ID is not greater than the old root ID, the bridge judges whether it is a designated bridge or a backup bridge, in the following way by using a root path cost 34 and a bridge ID 35 contained in the Hello message (Step 142).

The root path cost in the Hello message indicates the path cost up to the bridge, to which the Hello message has been relayed, the value of the root path cost being zero at the point of time where the root bridge has transmitted the Hello message. The value of the path cost of the message passing through each of the bridges is given in advance, which value is added to the value of the root path cost contained in the Hello message before the relay thereof. Further, the value of the updated root path cost stated above is memorized in the bridge as the root path cost from the bridge itself to the root bridge.

When the root path cost written in the received Hello message is lower than the root path cost, which the bridge itself has memorized, the relevant bridge decides to be a backup bridge for the LAN, which the Hello message has just passed through. When the root path cost written in the received Hello message is higher than the root path cost, which the bridge itself has memorized, the relevant bridge is a designated bridge for the LAN, which the Hello message has just passed through. When the root path cost written in the received Hello message is equal to the root path cost, which the bridge itself has memorized, it compares the last bridge ID 35 in the Hello message with its own bridge ID. When the former is greater than the latter, the bridge becomes a backup bridge and when the former is smaller than the latter, it acts as a designated bridge. The operation described above means that in each of the LANs, the bridge, for which the path cost to the root bridge is the smallest, and in the case where there exist a plurality of smallest values, the bridge for which the bridge ID is the smallest, acts as a designated bridge.

In Step 146, the control information described above, such as the root ID, the root path cost, the backup flag, etc. is updated. Each of the bridges aborts the Hello message, in the case where the bridge acts as a backup bridge (Steps 148-150), and in the case where it is not, i.e. as far as the bridge acts as a designated bridge, it relays the received Hello message to the adjacent LAN (Step 152).

The reception timer 13', which each of the, second bridges 3 has, is never in a time-out state, so long as the Hello message, which the root bridge 6 transmits periodically, can be received normally. On the other hand, when some hindrance takes place in a part of the root and no Hello message is received, the reception timer should be in a time-out state.

Figure 9:
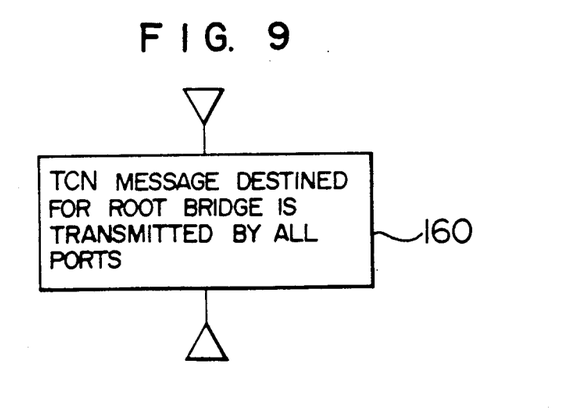
FIG. 9 is a flow chart showing an operation, when a Hello message reception timer is in a time-out state, in each of the bridges.

In the bridge, in which the reception timer 13' is in a time-out state, a routine indicated in FIG. 9 is started and a TCN message for informing the root bridge of the fact that there has taken place some change in the topology of the network, is outputted by all the ports (Step 160).

Figure 10:
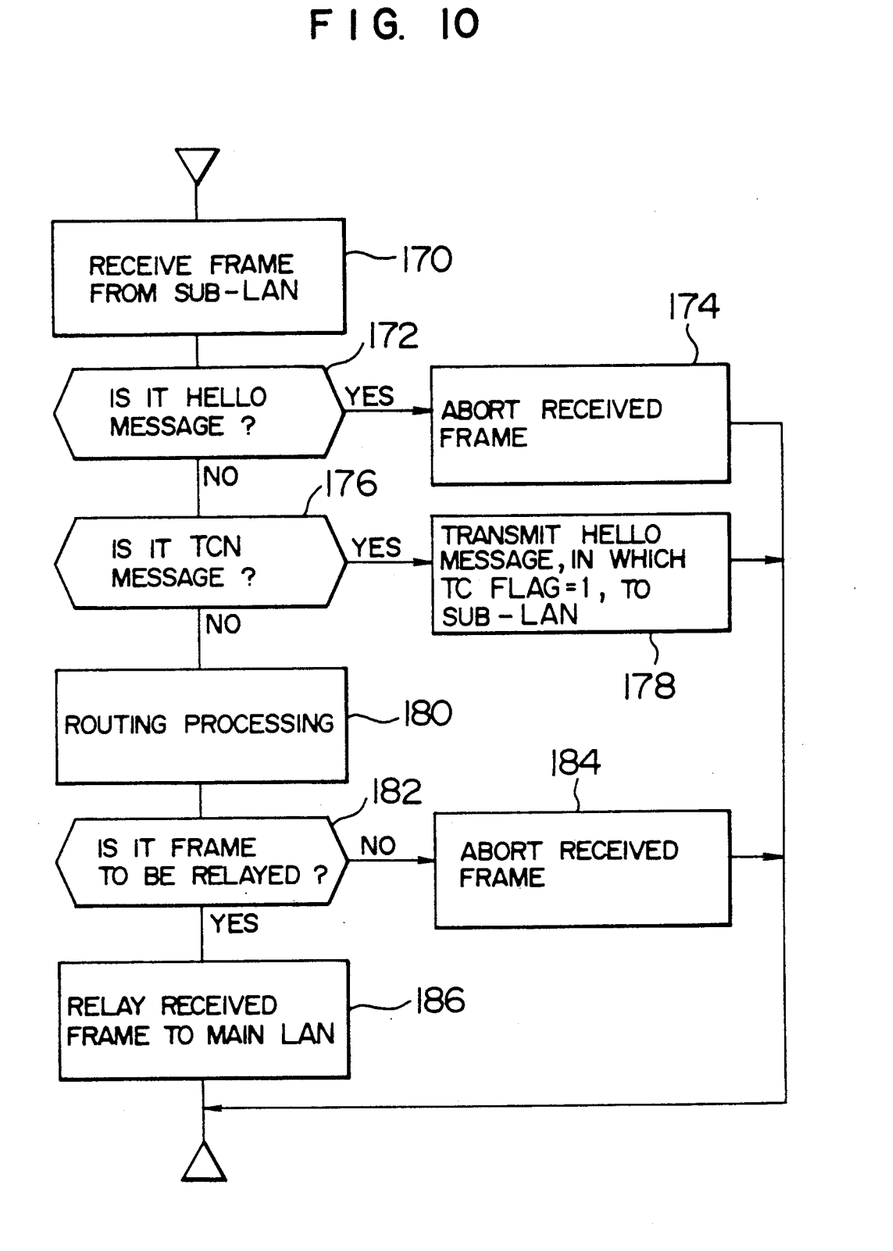
FIG. 10 is a flow chart showing an operation for processing a frame received from a sub-LAN at the root bridge.

FIG. 10 shows a flow chart of a routine for processing a frame, which a first bridge 6 has received from the side of the sub-LANs. When the first bridge has received the frame (Step 170), it judges whether the frame is a Hello message or not (Step 172). When it is a Hello message, the message is aborted (Step 174). If the received message is not a Hello message, it is judged whether the received message is a TCN message or not (Step 176) and if it is a TCN message, a Hello message, in which the TC flag 32 is set to "1", is formed and transmitted to the side of the sub-LANs (Step 178). In the case where the received message is no TCN message, i.e. in the case where it is a usual communication message, a routing processing which refers to the routing table, adds data to the routing table, etc. is effected (Step 180). If the communication message described above is to be relayed to the main LAN (Step 182), the communication message is transmitted to the relevant transmitting and receiving circuit 7B (Step 186). In the case where it is unnecessary to relay the received communication message as a result of the reference to the routing table, the communication message is aborted (Step 184).

For the frame received from the side of the main LAN the judgment of the kind of the message in Steps 172 and 176 described above is unnecessary and it is sufficient to effect only the processing corresponding to Steps 180 to 186, because, it is not possible according to this invention for either a Hello message or a TCN message to flow through the main LAN 5.

Figure 11:
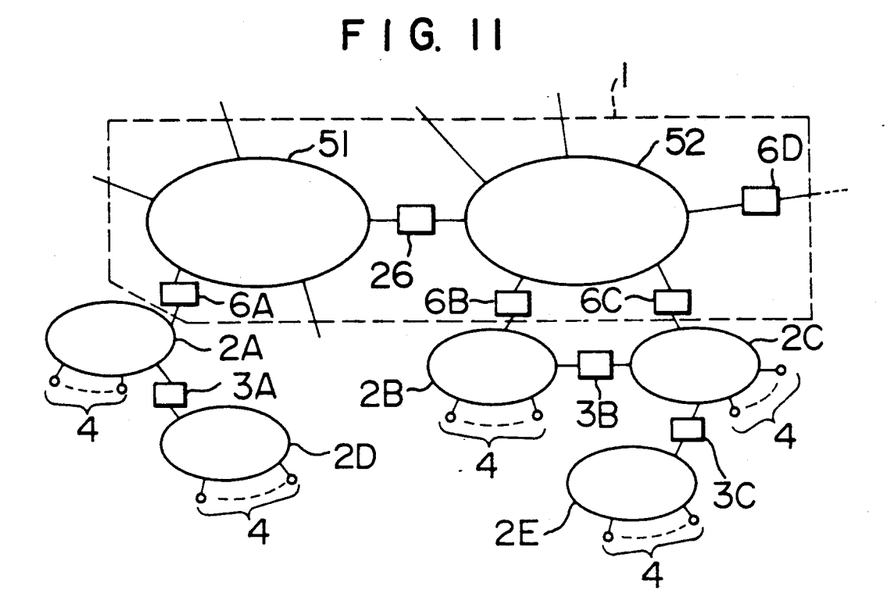
FIG. 11 illustrates another example of the network, to which this invention is applied.
Figure 12:
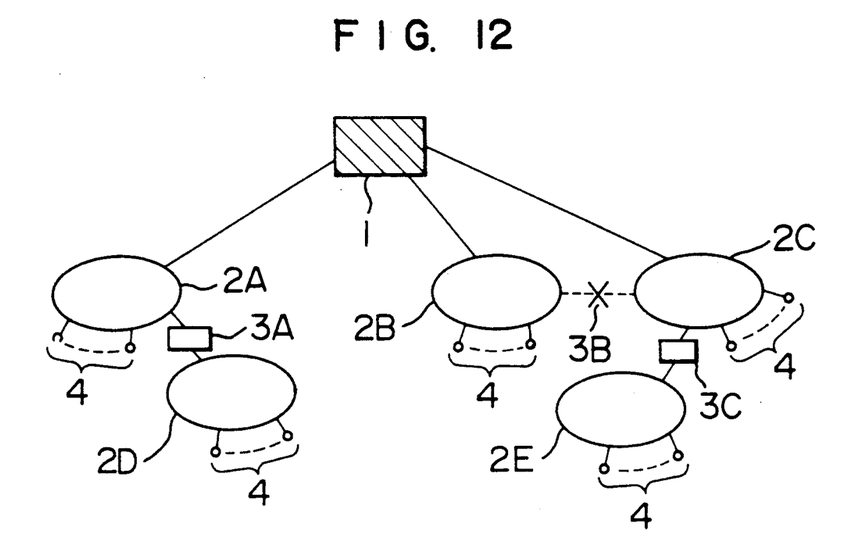
FIG. 12 is a scheme showing the form of the spanning tree formed by the network indicated in FIG. 11.

FIG. 11 indicates another example of the network, to which this invention applied. In this network system two main LANs 51 and 52 are coupled by a third bridge 26 and a plurality of sub-LANs are connected to each of the main LANs through first bridges 6A-6D. Also in this network, since a subsystem enclosed by a broken line and comprising the main LANs 51, 52, the first bridges 6A-6D and the third bridge 26 can be considered to be a logical bridge, a spanning tree can be formed, as indicated in FIG. 12.

As is clearly seen from the above explanation, according to this invention, when a spanning tree is formed by assigning a bridge ID having the, highest priority to the first bridges connected to at least one main LAN having a high speed and a large capacity with respect to each sub-LAN, the main LAN is positioned at the root of the tree and a network system thus constructed can deal with the concentration of traffic with a high efficiency. Further, since each of the first bridges serving as a root bridge transmits the Hello message for reconstructing the spanning tree due to change in the topology only to the side of the sub-LANs, an operation for the reconstruction of the spanning tree can be localized in a part of the domain in the network. At the time of reconstructing the spanning tree, since various sorts of control information and the content of the routing table are initialized, the routing function decreases temporarily and unnecessary traffic increases. According to this invention, since the decrease in the routing function stated above is localized in a particular domain in the network, an increase in the traffic in the whole system can be suppressed.

Although bridge IDs having a same value are given to the first bridges in the above embodiments, if each of the bridges is constructed so as to transmit the Hello message only to the side of the sub-LANs, bridge IDs different from each other may be given to each of the first bridges, so long as their priority is higher than the IDs of the other second bridges.

We claim

1. A hierarchical routing network system, comprising a plurality of local area networks (LANs) interconnected by a plurality of bridge means for transmitting communication messages between terminal devices connected to said LANs, in which a spanning tree structure, whose root is constructed by means including more than one bridge assigned a bridge ID of highest priority, is formed by controlling at least one of said plurality of bridge means to work in backup mode, where no communication message is relayed, in an operating state, characterized by:

said plurality of LANs including at least one main LAN having a relatively high data transmission speed and capacity and a plurality of sub-LANs having a relatively low data transmission speed and capacity;

each of said bridge means for connecting two adjacent LANs having:

(a) means for selectively relaying communication messages received from one of said adjacent LANs to the other according to an destination address included in each of said received messages;

(b) means for periodically sending out first control messages for constructing said spanning tree structure with respect to said adjacent LANs;

(c) means for determining whether the bridge means should operate so as to periodically send out said first control messages or operate so as to relay first control messages received from one of said adjacent LANs to the other in accordance with a result of comparison between a bridge ID assigned to the bridge means and that included in the received control message; and (d) means for determining whether or not the bridge means should operate in the backup mode in accordance with a result of comparison between cost information included in a second control message for instructing reconstruction of said spanning tree received by one of said adjacent LANs and an estimated cost of a message to be relayed to said one adjacent LAN from the other;

a plurality of first ones of said bridge means for connecting said main LAN and said sub-LANs being assigned bridge IDs of priority higher than that given to second ones of said bridge means connecting sub-LANs with each other;

each of said second bridge means having means for monitoring the arrival of said first control messages from one of said adjacent LANs and for sending out a notification message to said adjacent LANs if abnormality in the transmission of the first control message has been detected by said monitoring; and each of said first bridge means having means for sending out said second control message in response to reception of said notification message from one of said second bridge means and being operated so as to transmit no first and second control message to said main LAN, but to transmit them only to the side of the sub-LANs connected therewith, whereby the operation for reconstruction of the spanning tree is carried out locally within a partial tree area including one of said first bridge means as its root.

2. A hierarchical routing network system according to claim 1, wherein all of said first bridge means are assigned with bridge IDs having a same value.

3. A hierarchical routing network system according to claim 1, wherein each of said second bridge means has timer means for checking whether said first control message is received periodically or not and operates so as to transmit said notification messages to adjacent LANs in a case where no succeeding first control message is received within a predetermined period of time after having received a preceding first control message; and each of said second bridge means operates so as to relay said notification message received from one of adjacent LANs to the other even if it is in the backup mode.

4. A hierarchical routing network system according to claim 2, wherein each of said second bridge means has timer means for checking whether said first control message is received periodically or not and operates so as to transmit said notification messages to adjacent LANs in a case where no succeeding first control message is received within a predetermined period of time after having received a first control message; and said second bridge means operates so as to relay said notification message received from one of adjacent LANs to the other even if it is in the backup mode.

5. A method for constructing a spanning tree structure in a hierarchical network system having a plurality of local networks interconnected by a plurality of bridge means for transmitting a communication signal between terminal devices connected to said LANs, said LANs including at least one main LAN having a relatively high data transmission speed and capacity and a plurality of sub-LANs each having a relatively low transmission speed and capacity, said bridge means including a plurality of first bridge means each forming with said main LAN a root for connecting said main LAN with one of said sub-LANs and a plurality of second bridge means each for connecting adjacent sub-LANs with each other, each of said first bridge means being assigned a bridge ID of priority higher than that given to any one of said second bridge means, said spanning tree structure being constructed by making at least one said second bridge means operate in a backup mode where no communication signal is relayed between two adjacent sub-LANs connected through said second bridge means, said method comprising the steps of:

transmitting periodically first control signals for constructing the spanning tree structure from said first bridge means to the side of the sub-LAN without transmitting them to said main LAN;

monitoring reception of said first control signal at said respective second bridge means to detect whether an abnormality has occurred in the network;

transmitting a notification signal from any one of said second bridge means to each of said sub-LANs adjacent thereto when said second bridge means has detected said abnormality in the network;

transmitting a second control signal for reconstructing the spanning tree structure from one of said first bridge means to a sub-tree of the network, whose root is formed of said one first bridge means, without transmitting the second control signal to said main LAN when said one first bridge means has received notification signal from one of said sub-LANs; and determining by each of said second bridge means included in said sub-tree, to which said second control signal has been transmitted, whether or not the second bridge means should operate thereafter in a backup mode in accordance with a result of comparison between cost information included in the second control signal received from one of its adjacent sub-LANs and an estimated cost of the second signal to be transmitted therethrough to said one adjacent sub-LAN from the other of said adjacent sub-LAN when said second bridge means has received said second control signal.

6. A method for construction a spanning tree structure according to claim 5, further comprising the step of:

transmitting a first control signal for constructing the spanning tree structure from each of said second bridge means to respective sub-LANs connected therewith; and comparing in each of said second bridge means a bridge ID included in a first control signal received from any one of a pair of adjacent sub-LANs with a bridge ID assigned to said second bridge means to determine whether the second bridge means should operate so as to repeat the transmission of its own first control signal periodically while aborting said received first control signal or should operate so as to relay said first control signal received from one of the adjacent sub-LANs to the other while inhibiting transmission of its own first control signal.

* * * * *